(12) United States Patent
Mukai et al.

(10) Patent No.: US 10,935,207 B2
(45) Date of Patent: Mar. 2, 2021

(54) AIRCRAFT LAMP

(71) Applicant: Koito Manufacturing Co., Ltd., Tokyo (JP)

(72) Inventors: Tomoyuki Mukai, Shizuoka (JP); Akio Shoji, Shizuoka (JP)

(73) Assignee: KOITO MANUFACTURING CO., LTD., Tokyo (JP)

(*) Notice: Subject to any disclaimer, the term of this patent is extended or adjusted under 35 U.S.C. 154(b) by 0 days.

(21) Appl. No.: 16/738,128

(22) Filed: Jan. 9, 2020

(65) Prior Publication Data

US 2020/0232619 A1    Jul. 23, 2020

(30) Foreign Application Priority Data

Jan. 18, 2019   (JP) ................................ 2019-007152

(51) Int. Cl.
| | |
|---|---|
| *F21S 43/14* | (2018.01) |
| *F21V 5/00* | (2018.01) |
| *F21S 43/20* | (2018.01) |
| *F21Y 115/10* | (2016.01) |

(52) U.S. Cl.
CPC .............. *F21S 43/14* (2018.01); *F21S 43/20* (2018.01); *F21S 43/26* (2018.01); *F21V 5/007* (2013.01); *F21Y 2115/10* (2016.08)

(58) Field of Classification Search
CPC . F21S 43/14; F21S 43/20; F21S 43/26; F21V 5/007
See application file for complete search history.

(56) References Cited

U.S. PATENT DOCUMENTS

| | | | | |
|---|---|---|---|---|
| 8,297,811 | B2 * | 10/2012 | Mukai ..................... | F21V 23/06 362/470 |
| 2010/0271818 | A1 * | 10/2010 | Smith ................... | B60Q 1/2611 362/235 |
| 2013/0148351 | A1 * | 6/2013 | Georgitsis ............. | F21V 29/507 362/239 |
| 2014/0168975 | A1 * | 6/2014 | Ng ........................... | F21V 5/10 362/244 |
| 2014/0362589 | A1 * | 12/2014 | Chen ....................... | F21V 5/007 362/335 |
| 2018/0204490 | A1 * | 7/2018 | De Brouwer ......... | F21V 23/003 |

FOREIGN PATENT DOCUMENTS

| | | |
|---|---|---|
| JP | 2010-033840 A | 2/2010 |
| JP | 2010-033841 A | 2/2010 |

* cited by examiner

*Primary Examiner* — William N Harris
(74) *Attorney, Agent, or Firm* — Abelman, Frayne & Schwab

(57) ABSTRACT

An aircraft lamp includes: a lamp outer case constituted by a lamp housing having an opening and a cover mounted to the lamp housing in a state where the opening is closed, an internal space being formed in the lamp outer case as an arrangement space; a light source including a light emitting diode and arranged on an arrangement surface inclined with respect to a predetermined surface to be irradiated in the arrangement space; and an inner lens arranged in the arrangement space and including a control lens configured to control an irradiation direction of light emitted from the light source. The control lens is formed in a shape having a longitudinal direction and a width direction, and the longitudinal direction and the width direction of the control lens are rotated in a direction around a light source optical axis with respect to a vertical direction and a left-right direction.

10 Claims, 5 Drawing Sheets

AIRCRAFT LAMP

CROSS-REFERENCE TO RELATED APPLICATIONS

This application is based on and claims priority from Japanese Patent Application No. 2019-007152, filed on Jan. 18, 2019, with the Japan Patent Office, the disclosure of which is incorporated herein in its entirety by reference.

TECHNICAL FIELD

The present disclosure relates to an aircraft lamp in which a light source is arranged inside a lamp outer case, and that is used by being mounted to an aircraft body or the like.

BACKGROUND

In some aircraft lamps, a light source is arranged inside a lamp outer case constituted by a cover and a lamp housing (see, e.g., Japanese Patent Laid-Open Publication Nos. 2010-033840 and 2010-033841).

There are various types of such aircraft lamps depending on usage purposes, and as external lightings, for example, there is a collision prevention light that prevents collision between aircrafts, an aviation light that indicates a flight posture or a flight direction of an aircraft, a landing light that irradiates a runway during take-off and landing, and a logo lamp that illuminates a logo such as an airline written on an aircraft body.

SUMMARY

In such external lighting, it is desired that the entire irradiated surface is irradiated with light at a predetermined illuminance. In particular, in a logo lamp that illuminates a logo written on an aircraft body, since the range or the size of the irradiated surface is set depending on the location of the logo, it is necessary to set the light distribution in accordance with the range or the size of the irradiated surface.

Therefore, an aircraft lamp of the present disclosure is provided to secure a state where an entire irradiated surface is irradiated with light at a predetermined illuminance.

First, the aircraft lamp according to the present disclosure includes a lamp outer case constituted by a lamp housing having an opening and a cover mounted to the lamp housing in a state where the opening is closed, an internal space being formed in the lamp outer case as an arrangement space; a light source including a light emitting diode and arranged on an arrangement surface inclined with respect to a predetermined surface to be irradiated in the arrangement space; and an inner lens arranged in the arrangement space and including a control lens configured to control an irradiation direction of light emitted from the light source. The control lens is formed in a shape having a longitudinal direction and a width direction, and the longitudinal direction and the width direction of the control lens are rotated in a direction around a light source optical axis with respect to a vertical direction and a left-right direction.

Therefore, the light is controlled by the control lens in which the longitudinal direction and the width direction are rotated in a direction around a light source optical axis with respect to a vertical direction and a left-right direction, and is irradiated to the irradiated surface.

Second, in the aircraft lamp according to the present disclosure, a light distribution pattern of the light emitted from the light source may be formed in a substantially elliptical shape.

Therefore, the light distribution pattern is formed in a shape extending in one direction.

Third, in the aircraft lamp according to the present disclosure, a plurality of light sources is provided, a plurality of control lenses is provided in the same number as the light sources, and the irradiation direction of the light emitted from each of the plurality of light sources is controlled by each of the plurality of control lenses.

Therefore, an amount of light flux toward the irradiated surface increases.

Fourth, in the aircraft lamp according to the present disclosure, the plurality of control lens is provided side by side, and portions of the control lenses adjacent to each other are overlapped with each other.

Therefore, the plurality of control lenses is arranged in a state where respective portions are overlapped.

According to the present disclosure, since the light is controlled by the control lens in which the longitudinal direction and the width direction are rotated in a direction around a light source optical axis with respect to a vertical direction and a left-right direction, and is irradiated to the irradiated surface, it is possible to secure the state where the entire irradiated surface is irradiated with light at a predetermined illuminance.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawings, which form a part hereof. The illustrative embodiments described in the detailed description, drawings, and claims are not meant to be limiting. Other embodiments may be utilized, and other changes may be made, without departing from the spirit or scope of the subject matter presented here.

Hereinafter, an embodiment for implementing an aircraft lamp of the present disclosure will be described with reference to the accompanying drawings.

In the aircraft lamp, a light source is arranged inside a lamp outer case, and the lamp outer case is constituted by a lamp housing and a cover. In the following descriptions, front-rear, upward-downward, and left-right directions are illustrated by setting a coupling direction of the lamp housing and the cover to a vertical direction, and the cover as an upper side, and the lamp housing as a lower side.

The front-rear, upward-downward, and left-right directions illustrated in the following are for convenience of explanation, and the implementation of the present disclosure is not limited to these directions.

In the following, an example in which the aircraft lamp of the present disclosure is applied to a logo lamp that is an external lighting is illustrated. However, the scope of application of the present disclosure is not limited to the logo lamp, but may be applied to other external lighting used in an aircraft. Further, in the following, an example in which the irradiated surface illuminated by the aircraft lamp is each surface of a vertical tail wing is illustrated. However, the irradiated surface illuminated by the aircraft lamp is not limited to each surface of the vertical tail wing, but may be an irradiated surface other than the vertical tail wing in the aircraft or an irradiated surface other than an aircraft.

Figure 1:
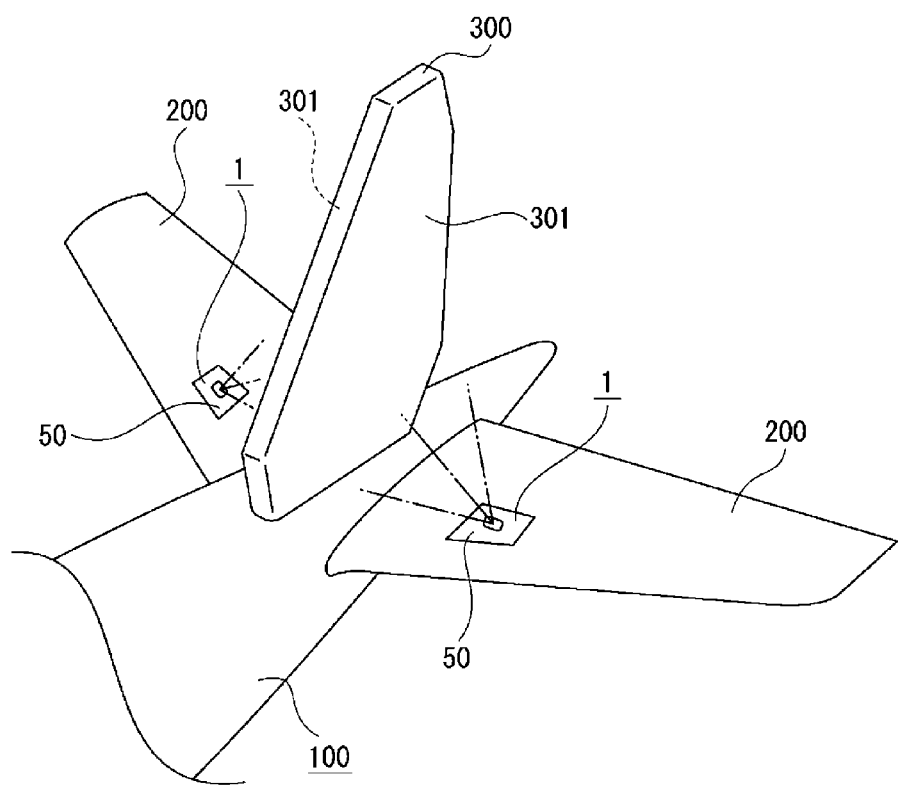
FIG. 1 illustrates an embodiment of an aircraft lamp of the present disclosure together with FIGS. 2 to 6, and is a perspective view illustrating a portion of an aircraft.
Figure 2:
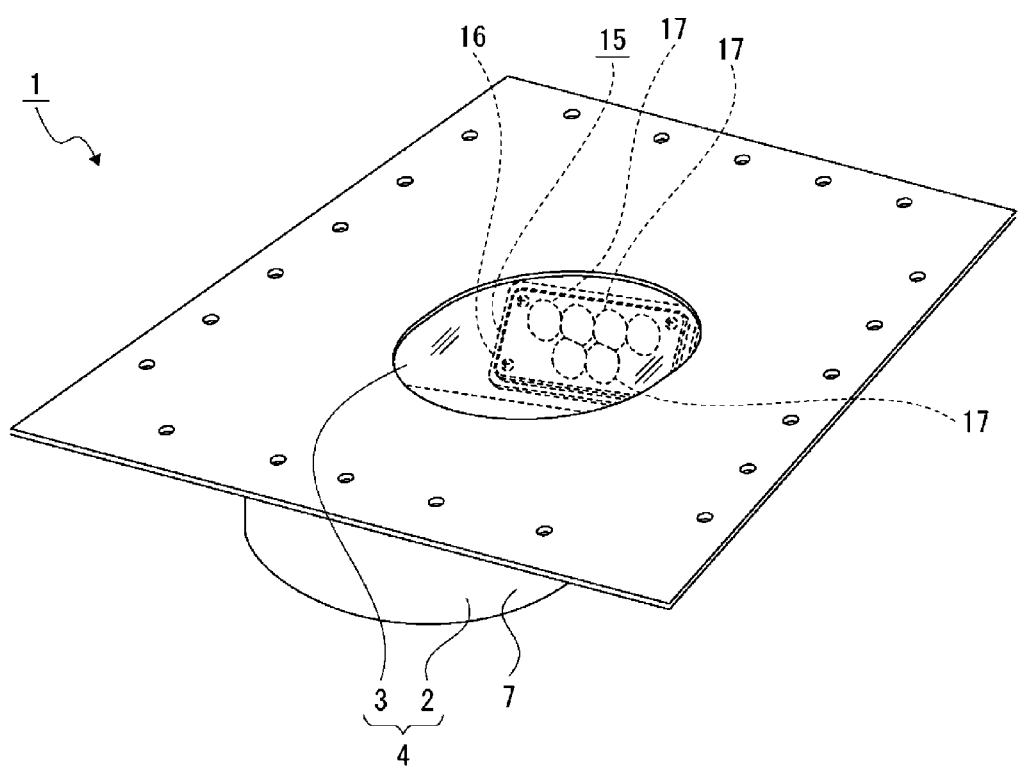
FIG. 2 is a perspective view of the aircraft lamp.

An aircraft lamp 1 is used, for example, as a logo lamp that is an external lighting, is mounted to an aircraft body 100, for example, both horizontal tail wings 200 and 200 on the rear side, and has a function of illuminating a logo (not illustrated) written on a vertical tail wing 300 (see FIG. 1). Therefore, light emitted from the aircraft lamp 1 at one side is irradiated to one surface of the left and right surfaces of the vertical tail wing 300, and light emitted from the aircraft lamp 1 at the other side is irradiated to the other surface of the left and right surfaces of the vertical tail wing 300. The left and right surfaces of the vertical tail wing 300 become irradiated surfaces 301 and 301, respectively.

An arrangement recess (not illustrated) is formed in the horizontal tail wing 200, and a mounting plate 50 that covers the arrangement recess is mounted to the horizontal tail wing 200. An arrangement hole 50a that penetrates vertically is formed in the mounting plate 50.

The aircraft lamp 1 includes a lamp housing 2 having an opening at the upper end and a cover 3 mounted to the lamp housing 2 in a state where the opening of the lamp housing 2 is closed. A lamp outer case 4 is constituted by the lamp housing 2 and the cover 3, and the internal space of the lamp outer case 4 is formed as an arrangement space 5.

Figure 3:
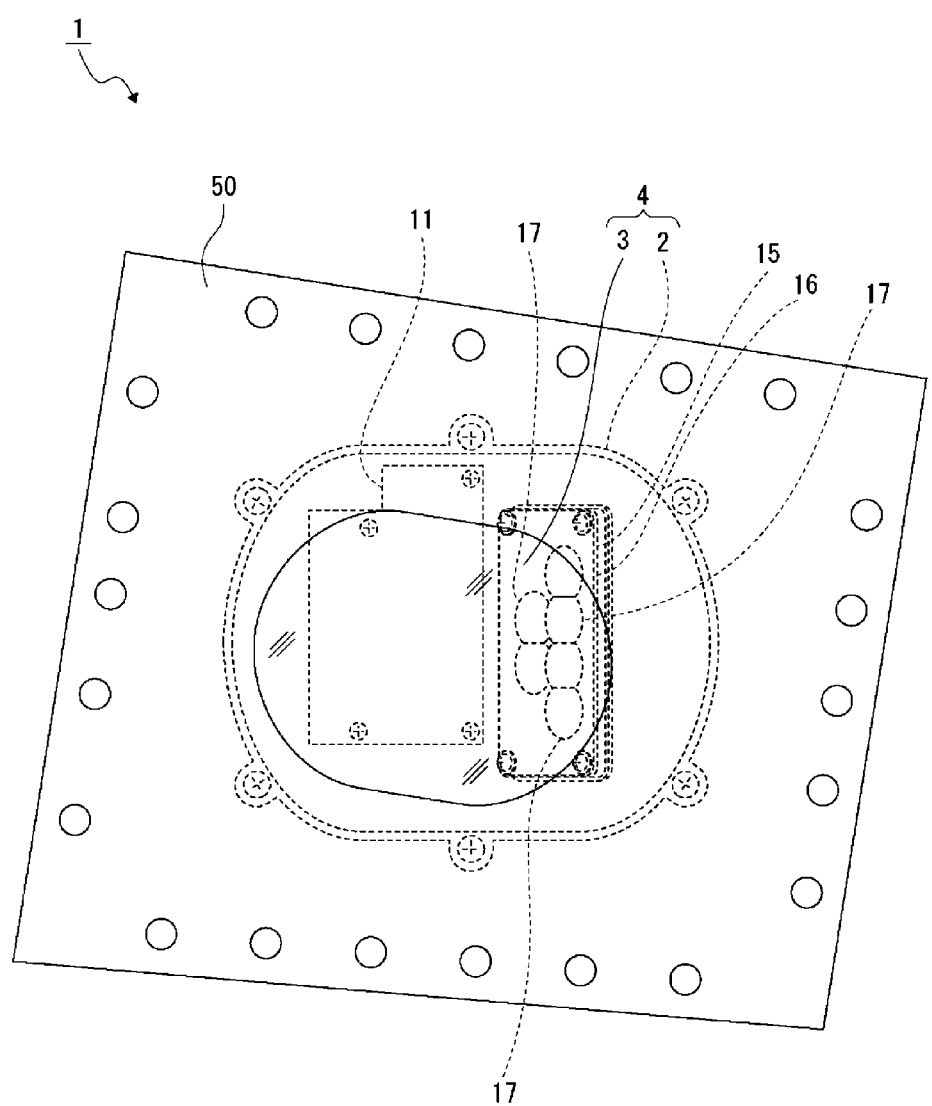
FIG. 3 is a plan view of the aircraft lamp.
Figure 4:
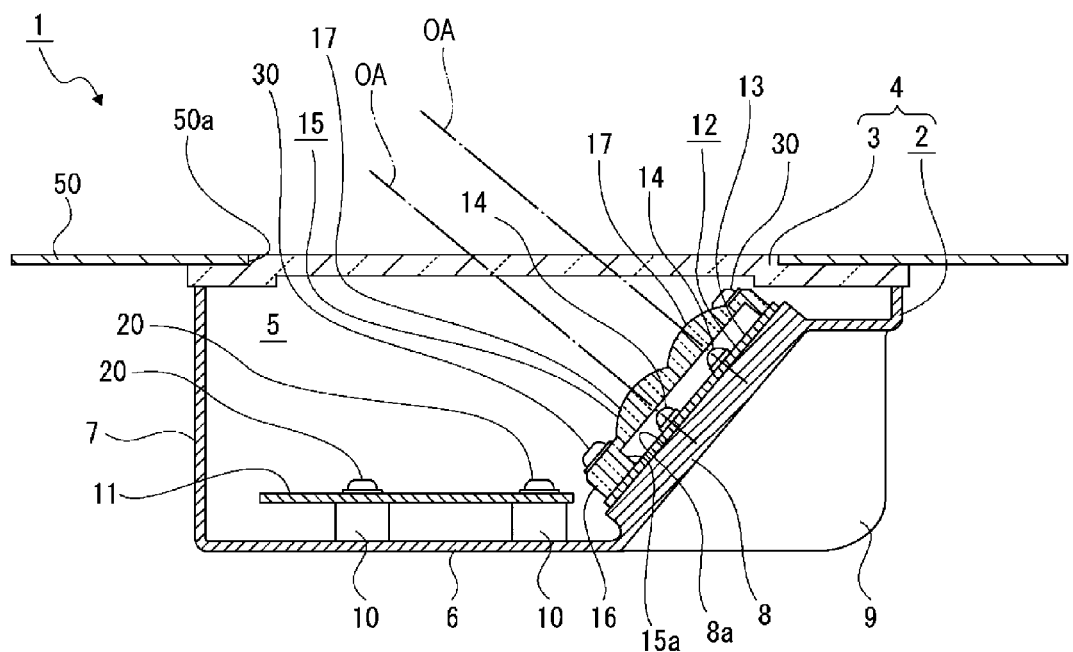
FIG. 4 is a cross-sectional view of the aircraft lamp.

Each part of the lamp housing 2 is integrally formed of a metal material such as aluminum. The lamp housing 2 includes a bottom surface portion 6 facing in the vertical direction, and a peripheral surface portion 7 protruding from the outer peripheral portion of the bottom surface portion 6 (see FIGS. 3 and 4). A portion of the peripheral surface portion 7 is provided as an inclined portion 8, and the inclined portion 8 is inclined with respect to the bottom surface portion 6. The inclined portion 8 is inclined in a direction away from the vertical tail wing 300 in the left-right direction as it goes upward. The inner surface of the inclined portion 8 is formed as an arrangement surface 8a, and the arrangement surface 8a is inclined with respect to the irradiated surface 301.

Heat radiation fins 9, 9, . . . are provided at the lamp housing to be spaced apart from each other in the front-rear direction. The heat radiation fins 9, 9, . . . are provided on the outer surface side of the inclined portion 8.

Mounting bosses 10, 10, . . . protruding upward from the bottom surface portion 6 are provided at the lamp housing 2 to be spaced apart from each other in the front-rear and left-right directions.

The outer peripheral portion of the cover 3 is mounted to the mounting plate 50 from the inner surface side by, for example, screwing or the like, and a portion excluding the outer peripheral portion of the cover 3 is arranged in the arrangement hole 50a.

A control substrate 11 is arranged in the arrangement space 5 of the lamp outer case 4. The control substrate 11 is mounted to the mounting bosses 10, 10, . . . by, for example, screw members 20, 20, . . . . The control substrate 11 has a function of controlling turn-on/off state of a light source (will be described later).

A light source unit 12 is arranged on the arrangement surface 8a of the inclined portion 8. Therefore, the light source unit 12 is inclined with respect to the vertical tail wing 300. The light source unit 12 includes a flat-plate shape substrate 13 and light sources 14, 14, . . . mounted on the substrate 13, and for example, light emitting diodes are used as the light sources 14, 14, . . . . Screw insertion penetrating holes (not illustrate) are formed in the outer peripheral portion of the substrate 13.

Figure 5:
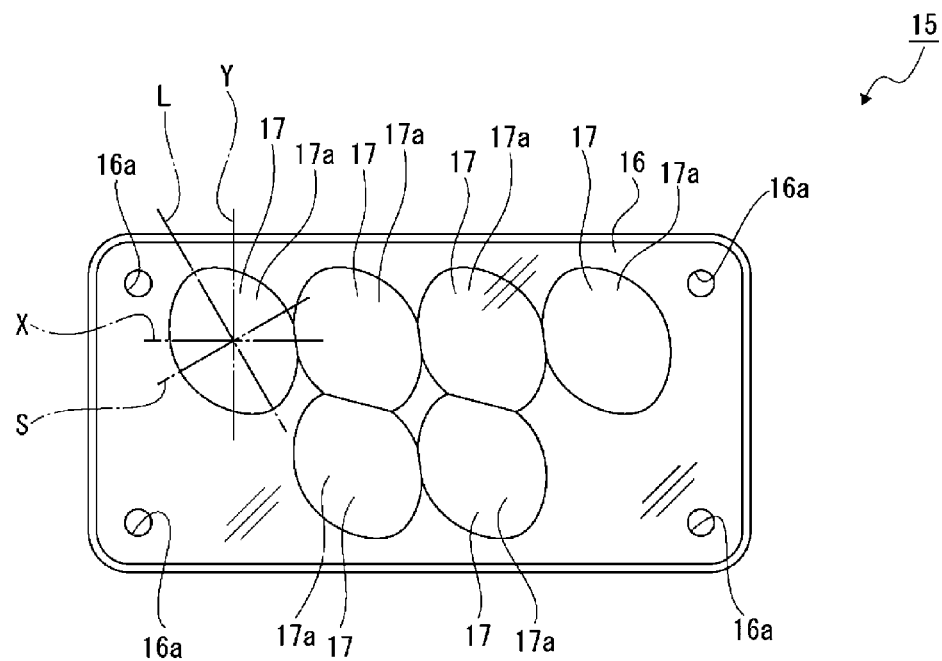
FIG. 5 is a front view of an inner lens.

An inner lens 15 is mounted on the inclined portion 8 in a state where the light source unit 12 is covered. Therefore, the inner lens 15 is inclined with respect to the vertical tail wing 300. The inner lens 15 is made by, for example, a transparent material such as glass, resin or the like, and a mounted plate 16 and control lenses 17, 17, . . . are integrally formed (see FIGS. 4 and 5).

The mounted plate 16 is formed in a substantially rectangular shape, and has insertion penetrating holes 16a, 16a, . . . at four corners.

The control lenses 17, 17, . . . are positioned, for example, adjacent to each other in the vertical and left-right directions, and for example, four control lenses are provided side by side on the upper side, two control lenses are provided side by side on the lower side, and the same number of the control lenses is provided as the light sources 14, 14, . . . . The control lenses 17, 17, . . . are protruded from one surface in the thickness direction of the mounted plate 16, and a surface 17a in the protruding direction is formed as a convex curved surface in the protruding direction. Central portions of the control lenses 17, 17, . . . are positioned corresponding to the light sources 14, 14, . . . , respectively.

The control lenses 17, 17, . . . are in a state where end portions on adjacent sides are overlapped. Specifically, for example, the end portions of the control lenses 17, 17, . . . arranged vertically by two are in the overlapped state, and the lower end portions of the control lenses 17 and 17 at the upper side and the upper end portions of the control lenses 17 and 17 at the lower side are in the overlapped state. In the inner lens 15, for example, the end portions of the control lenses 17, 17, . . . arranged in the left-right direction may be in the overlapped state.

The control lens 17 is formed in a shape having a longitudinal direction L and a width direction S, and the longitudinal direction L and the width direction S are rotated in the direction around the light source optical axis with respect to the vertical direction Y and the left-right direction X. The light source optical axis OA is a light emitting direction from the light source 14 toward the inner lens 15 (see FIG. 4), and the direction around the light source optical axis is a circumferential direction based on the light source optical axis. Specifically, the control lens 17 is formed as, for example, a substantially elliptical shape when viewed in the optical axis direction that is the thickness direction of the mounted plate 16. The longitudinal direction L (long axis direction) is slightly inclined to the direction around the light source optical axis with respect to the vertical direction Y, and the width direction S (short axis direction) is slightly inclined to the direction around the light source optical axis with respect to the left-right direction X.

A concave portion 15a opened in the opposite direction to the control lenses 17, 17, . . . are formed in the mounted plate 16 of the inner lens 15, and the concave portion 15a is positioned in a range where the control lenses 17, 17, ... are formed.

The inner lens 15 is mounted to the inclined portion 8 by screwing mounting screws 30, 30, ..., inserted into the insertion penetrating holes 16a, 16a, ... and the screw insertion penetrating hole of the substrate 13 in the order, to the inclined portion 8. Therefore, the inner lens 15 and the light source unit 12 are simultaneously mounted to the inclined portion 8 by the mounting screws 30, 30, ..., and the light source unit 12 is covered by the inner lens 15.

In the state where the inner lens 15 is mounted to the inclined portion 8, the light sources 14, 14, ... are arranged in the concave portion 15a, and as described above, the central portions of the control lenses 17, 17, ... are positioned corresponding to the light sources 14, 14, ..., respectively.

In the aircraft lamp 1 configured as described above, when light is emitted from the light sources 14, 14, ..., the emitted light is incident on the control lenses 17, 17, ... of the inner lens 15, respectively, and is controlled to be collected by the control lenses 17, 17, ..., and then, is transmitted through the cover 3 from the control lenses 17, 17, ... and irradiated to the irradiated surface 301 of the vertical tail wing 300.

Figure 6:
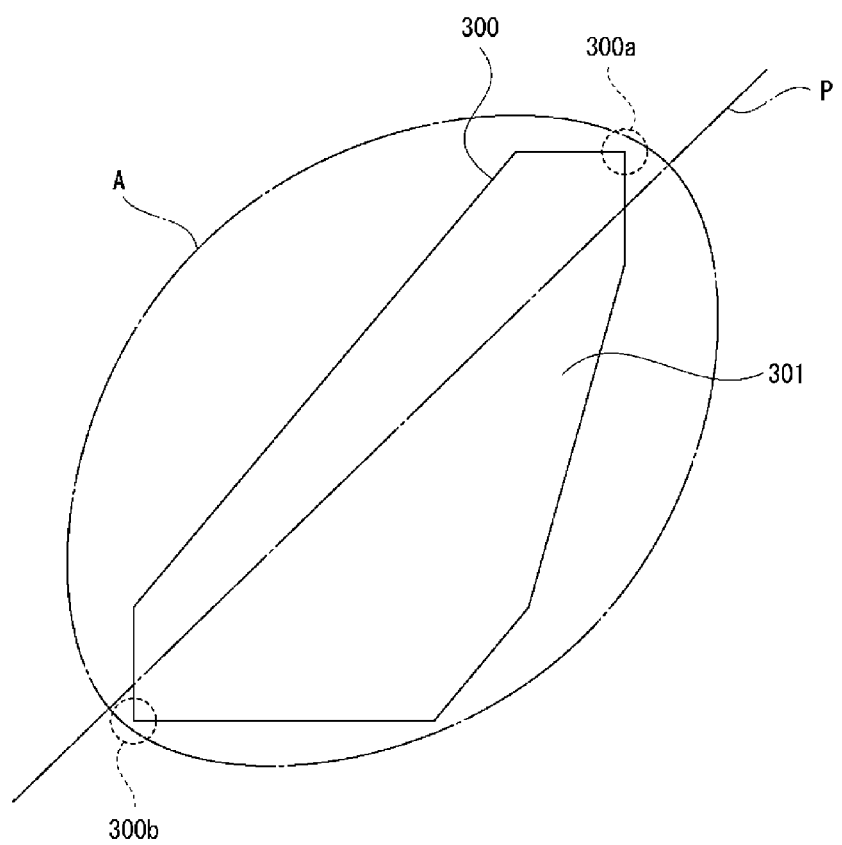
FIG. 6 is a view for explaining an irradiation state of light with respect to an irradiated surface.

The light controlled by the control lens 17 is formed in a substantially elliptical shape light distribution A and is irradiated to the vertical tail wing 300 (see FIG. 6). At this time, the elliptical shape light distribution A is formed such that the long axis direction is the direction coincide with the longitudinal direction P of the vertical tail wing 300, and the light is irradiated to the entire irradiated surface 301. Particularly, the light controlled by the control lens 17 is irradiated to both end portions 300a and 300b in the longitudinal direction P of the vertical tail wing 300, and the light is irradiated to the entire irradiated surface 301 with sufficient illuminance.

In the aircraft lamp 1, each light emitted from the light sources 14, 14, ... may be irradiated to the entire irradiated surface 301 by control of the control lenses 17, 17, .... Further, each light emitted from the light sources 14, 14, ... may be irradiated to each portion of the irradiated surface 301 and illuminate the entire irradiated surface 301 entirely, by control of the control lenses 17, 17, ....

As described above, when light is emitted from the light sources 14, 14, ..., heat is generated in the control substrate 11 and the light source unit 12. However, the generated heat is released to the outside from the bottom surface portion 6 or the inclined portion 8 of the lamp housing 2, or is transmitted from the bottom surface portion 6 or the inclined portion 8 to the heat radiation fins 9, 9, ..., and then released to the outside from the heat radiation fins 9, 9, .... Therefore, good heat radiation performance is secured, and a stable driving state of the control substrate 11 and the light source unit 12 is secured.

As described above, the aircraft lamp 1 includes the light source unit 12 that is arranged on the arrangement surface 8a inclined with respect to the irradiated surface 301, and includes a light emitting diode as the light source 14, and the inner lens 15 that includes the control lens 17 controlling the irradiation direction of the light emitted from the light source 14. The longitudinal direction L and the width direction S of the control lens 17 are rotated in the direction around the light source optical axis with respect to the vertical direction Y and the left-right direction X.

Therefore, since the light is controlled by the control lens 17 in which the longitudinal direction L and the width direction S are rotated in the direction around the light source optical axis with respect to the vertical direction Y and the left-right direction X, and is irradiated to the irradiated surface 301, it is possible to secure the state where the entire irradiated surface 301 is irradiated with light at a predetermined illuminance.

Further, the longitudinal direction L and the width direction S of the control lens 17 are rotated in the direction around the light source optical axis with respect to the vertical direction Y and the left-right direction X.

Therefore, it is possible to respectively irradiate light to the entire left and right radiated surfaces 301 and 301 by arranging the aircraft lamps 1 and 1 at symmetrical positions, and it is possible to reduce the manufacturing costs by sharing both the aircraft lamps 1 and 1.

Since the light distribution pattern of the light emitted from the light source 14 is formed in the substantially elliptical shape, the light distribution pattern is formed in the shape extending in one direction, and when the irradiated surface 301 is formed in the shape having the longitudinal direction P such as the vertical tail wing 300, it is possible to brightly illuminate the entire irradiated surface 301.

Further, the plurality of light sources 14 is provided, and the same number of the control lenses 17 is provided as the light sources 14. Since the irradiation direction of each light emitted from the plurality of light sources 14 is controlled by each control lens 17, freedom degree with respect to the light distribution may be improved. The light flux amount toward the irradiated surface 301 increases, and thus, it is possible to brightly illuminate the entire irradiated surface 301.

Additionally, since the plurality of control lenses 17 is provided side by side, and respective portions of the adjacent control lenses 17 are in the overlapped state, the plurality of control lenses 17 is arranged in the state where respective portions are overlapped, and thus, it is possible to reduce the size of the inner lens 15 and the aircraft lamp 1 provided with the inner lens 15.

Since respective portions of the adjacent control lenses 17 are in the overlapped state, the light emitted from the light source 14 may be lost. However, the light flux amount of the light (ambient light) transmitted through the outer peripheral portion of the control lens 17 is small, and thus, the loss of light is small. Therefore, even in the state where respective portions of the adjacent control lenses 17 are overlapped, it is possible to irradiate the entire irradiated surface 301 with light at a predetermined illuminance.

Further, in the above, the example in which the longitudinal direction L and the width direction S of the control lens 17 are rotated in the direction around the light source optical axis with respect to the vertical direction Y and the left-right direction X. However, depending on the direction in which the aircraft lamp 1 is arranged with respect to an aircraft body 100, it is also conceivable that the longitudinal direction L and the width direction S of the control lens 17 are rotated in the direction around the light source optical axis with respect to the vertical direction Y and the front-rear direction. Further, depending on the direction in which the aircraft lamp 1 is arranged with respect to an aircraft body 100, it is also conceivable that the longitudinal direction L and the width direction S of the control lens 17 are rotated in the direction around the light source optical axis with respect to the left-right direction X and the front-rear direction.

That is, the longitudinal direction L and the width direction S of the control lens 17 are rotated in the direction around the light source optical axis with respect to the vertical direction and the horizontal direction.

From the foregoing, it will be appreciated that various exemplary embodiments of the present disclosure have been described herein for purposes of illustration, and that various modifications may be made without departing from the scope and spirit of the present disclosure. Accordingly, the various exemplary embodiments disclosed herein are not intended to be limiting, with the true scope and spirit being indicated by the following claims.

What is claimed is:

1. An aircraft lamp comprising:
    a lamp housing having an opening and a cover mounted to the lamp housing in a state where the opening is closed, an arrangement space being formed in the lamp outer case;
    a light source including a light emitting diode and mounted on an inclined surface of the lamp housing, the inclined surface being inclined with respect to a bottom surface of the lamp housing; and
    an inner lens including a mounted plate mounted on the inclined surface of the lamp housing and arranged in the arrangement space, the mounted plate including an integrally formed control lens configured to control an irradiation direction of light emitted from the light source,
    wherein the control lens is formed in an elliptical shape having a center, a long axis and a short axis, a light source optical axis of the light source passes through center of the control lens, and the long axis and the short axis of the control lens are rotatably offset around the light source optical axis with respect to a vertical axis and a horizontal axis of the inner lens.

2. The aircraft lamp according to claim 1, wherein a light distribution pattern of the light emitted from the light source is formed in a substantially elliptical shape.

3. The aircraft lamp according to claim 1, wherein a plurality of light sources is provided,
    a plurality of control lenses is provided in the mounted plate in the same number as the light sources, and
    the irradiation direction of the light emitted from each of the plurality of light sources is controlled by each of the plurality of control lenses.

4. The aircraft lamp according to claim 2, wherein a plurality of light sources is provided,
    a plurality of control lenses is provided in the mounted plate in the same number as the light sources, and
    the irradiation direction of the light emitted from each of the plurality of light sources is controlled by each of the plurality of control lenses.

5. The aircraft lamp according to claim 3, wherein the plurality of control lenses are provided side by side in the mounted plate, and
    portions of the control lenses adjacent to each other are overlapped with each other.

6. The aircraft lamp according to claim 4, wherein the plurality of control lenses are provided side by side in the mounted plate, and
    portions of the control lenses adjacent to each other is overlapped with each other.

7. The aircraft lamp according to claim 1, wherein the lamp housing is mounted to a bottom surface of a mounting plate having an arrangement hole formed therein and at least a portion of the cover is flush with a top surface of the mounting plate.

8. The aircraft lamp according to claim 2, wherein the lamp housing is mounted to a bottom surface of a mounting plate having an arrangement hole formed therein and at least a portion of the cover is flush with a top surface of the mounting plate.

9. The aircraft lamp according to claim 3, wherein the lamp housing is mounted to a bottom surface of a mounting plate having an arrangement hole formed therein and at least a portion of the cover is flush with a top surface of the mounting plate.

10. The aircraft lamp according to claim 4, wherein the lamp housing is mounted to a bottom surface of a mounting plate having an arrangement hole formed therein and at least a portion of the cover is flush with a top surface of the mounting plate.

* * * * *